July 3, 1951  H. F. BREMER ET AL  2,559,063
AUTOMATIC DRINKING CUP DISPENSING DEVICE
Filed July 2, 1949  3 Sheets-Sheet 1
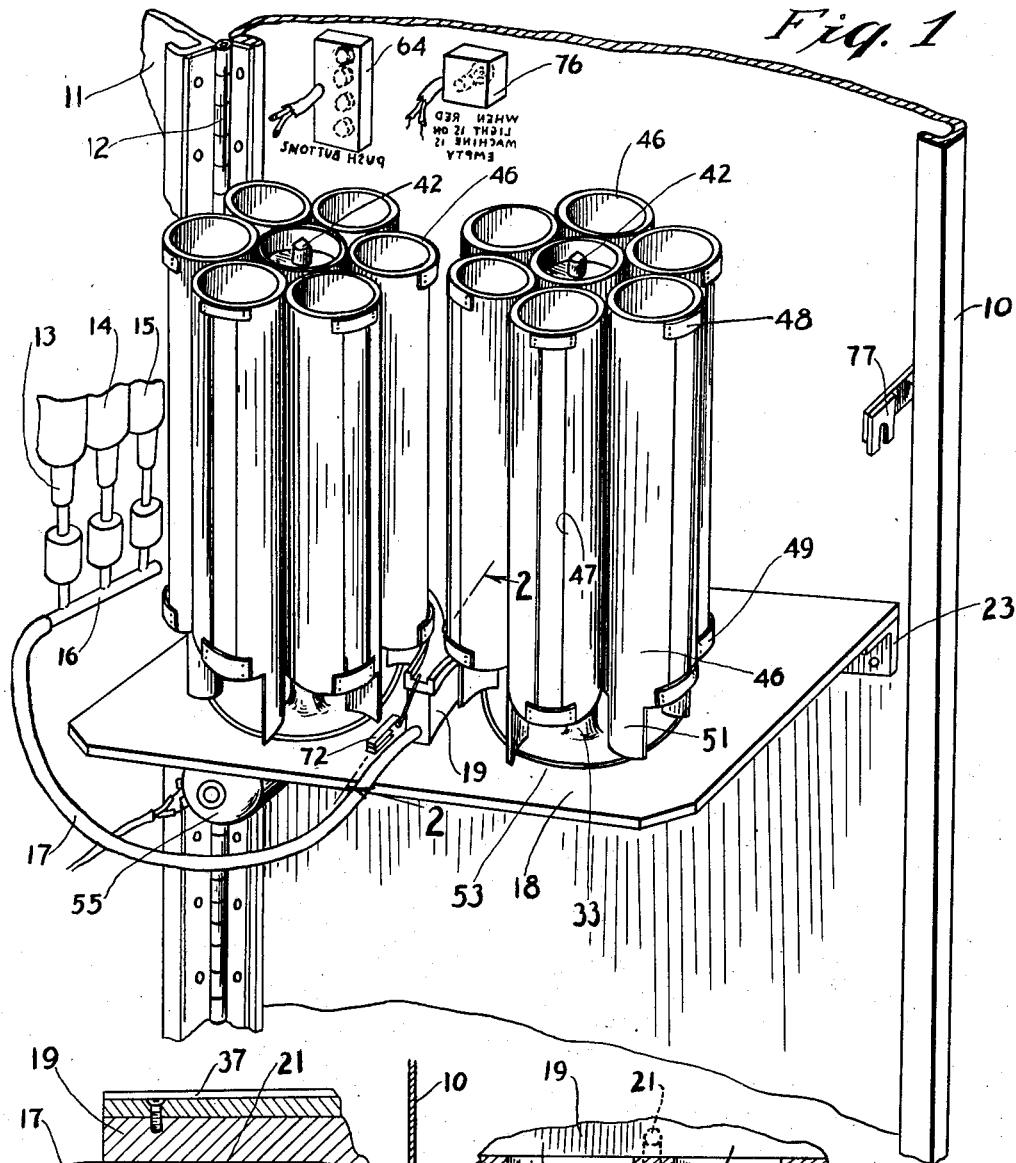
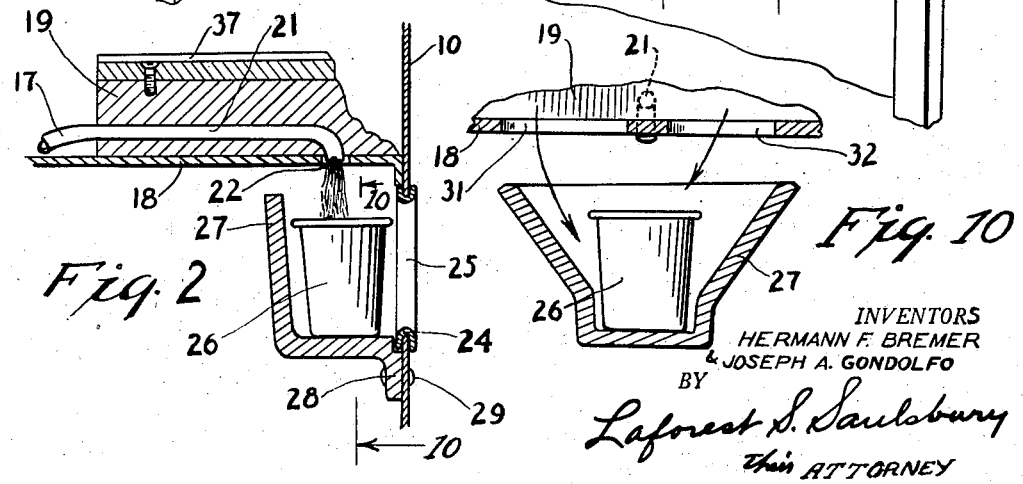
INVENTORS
HERMANN F. BREMER
& JOSEPH A. GONDOLFO
BY
Laforest S. Saulsbury
their ATTORNEY

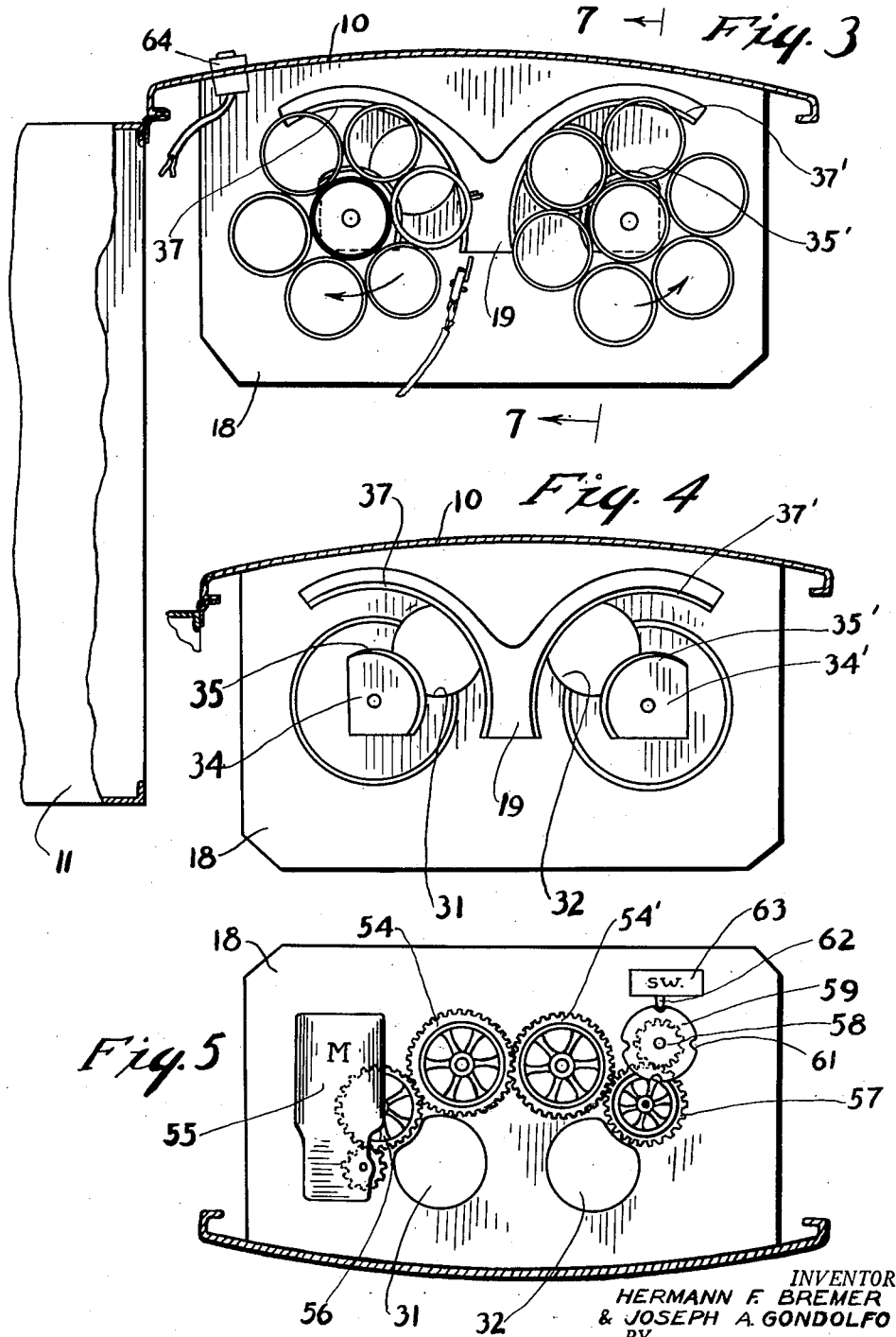

July 3, 1951     H. F. BREMER ET AL     2,559,063
AUTOMATIC DRINKING CUP DISPENSING DEVICE
Filed July 2, 1949     3 Sheets-Sheet 3
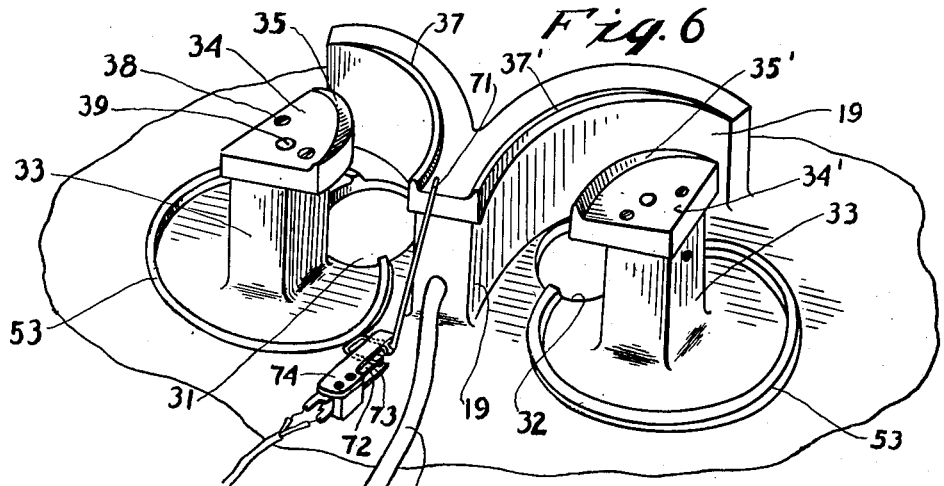
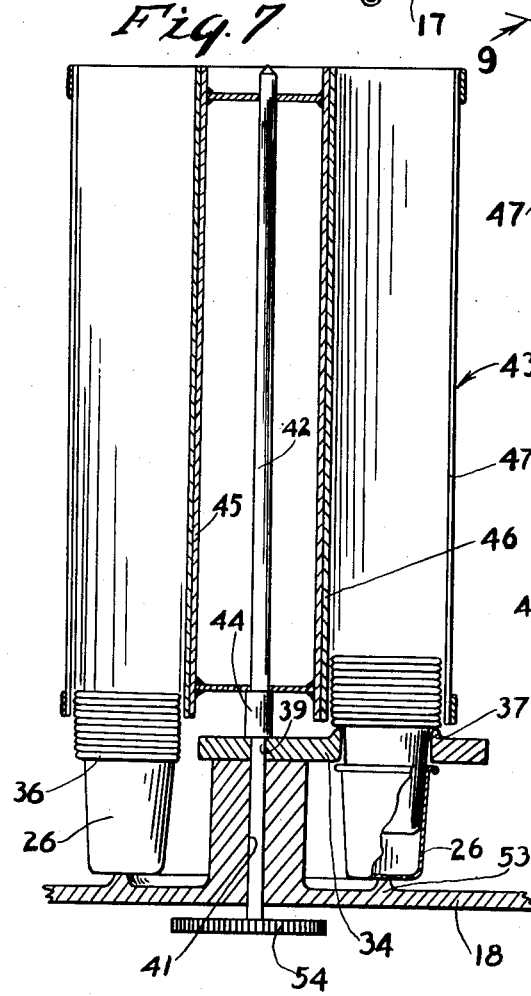
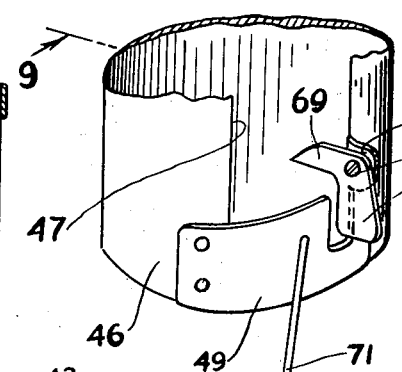
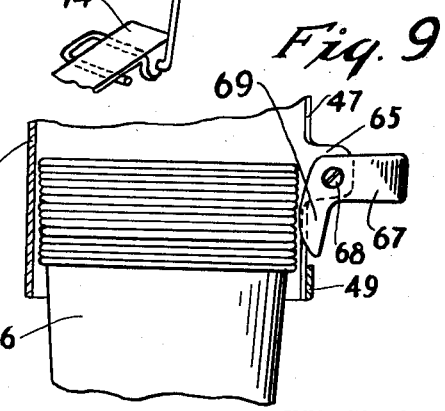
INVENTORS
HERMANN F. BREMER
& JOSEPH A. GONDOLFO
BY
Laforest S. Saulsbury
their ATTORNEY Patented July 3, 1951

2,559,063

UNITED STATES PATENT OFFICE 2,559,063

AUTOMATIC DRINKING CUP DISPENSING DEVICE

Hermann F. Bremer and Joseph A. Gondolfo, Bronx, N. Y., assignors, by mesne assignments, to Rainbows, Inc., New York, N. Y., a corporation of New York Application July 2, 1949, Serial No. 102,844

4 Claims. (Cl. 312—44)

This invention relates to an automatic drinking cup dispensing device.

It is an object of the present invention to provide an automatic drinking cup dispensing device adapted for use with automatic dispensing machines which are set into action by a coin and wherein the cups must be deposited one at a time at a station and position to receive the liquid being dispensed by the machine, such as coffee, carbonated drinks, or other liquids, and wherein the movement of the cup to the proper station is effected positively from a stack of closely fitted cups, there being positive cam means engaging with the thickened or rounded rim of the cup to positively displace a bottom cup from the stack and to drop the same through an opening into position to receive the liquid or coffee being dispensed.

It is another object of the present invention to provide a cup dispensing device which carries a plurality of columns of cups and wherein there is provided two independent rotatable supports lying adjacent one another, each support having several columns of cups and wherein a cup is dispensed from first one support and then the other in an alternate manner and in perfect timed relationship and whereby to make for compactness the storing of drinking cups and to permit, in a systematic manner, the storing of larger and greater number of cups than that stored with the standard type of dispensing devices, and to provide an arrangement which can be easily and effectively controlled from the coin-operated mechanism in timed relation with the dispensing of the liquid.

Other objects of the present invention are to provide an automatic drinking cup dispensing device which is of simple construction, inexpensive to manufacture, will contain a large number of cups, easy to install within an automatic liquid dispensing machine, durable and of unitary construction, easy to fill with cups as indicating means to indicate the depletion of the cup supply are operated, a switch device to stop the operation of the liquid dispensing machine, and efficient in operation.

For other objects and for a better understanding of the invention, reference may be had to the following detailed description taken in connection with the accompanying drawing, in which:

Fig. 1 is a perspective view looking upon the back of a door of a liquid dispensing machine and upon the cup dispensing device embodying the features of the present invention and including two separate rotary supports with tubes for receiving a plurality of stacks of drinking cups.

Fig. 2 is an enlarged vertical sectional view taken on line 2—2 of Fig. 1.

Fig. 3 is a top plan view of the device.

Fig. 4 is a plan view of the device with the rotary supports removed therefrom.

Fig. 5 is a bottom plan view of the device showing the gearing and the motor for operating the rotary supports.

Fig. 6 is an enlarged perspective view looking upon the cam elements for removing the individual cups and upon the switch to shut off the machine upon the depletion of the supply of cups.

Fig. 7 is a vertical sectional view taken on line 7—7 of Fig. 3.

Fig. 8 is an enlarged fragmentary perspective view of the lower end of one of the supporting tubes and looking upon the indicating and switch operating elements.

Fig. 9 is a vertical sectional view taken on line 9—9 of Fig. 8.

Fig. 10 is a fragmentary sectional view taken on line 10—10 of Fig. 2 and through the cup receiving support.

Referring now to the figures, 10 represents the door of a casing 11. The door lies in the front of the casing and is hinged thereto by a piano hinge 12 and in such a manner so that the door can be opened from the side of the casing 11. The casing 11 may contain liquid dispensing devices 13, 14 and 15 serving to dispense the ingredients of coffee to a mixing manifold 16 which is connected by a tube 17 to a support or base 18 and to an upright member 19 thereon. This member has a passage 21 extending through it to direct the liquid, such as coffee, downwardly through a hole 22 in the base plate 18, Fig. 2. This base plate is connected by brackets 23 to the door 10 and serves as the support for the parts of my rotary cup dispensing device.

In the door 10 is an opening 24 which has a grommet-like ring or member 25 tightly fitted therein and through which a hand can be extended to take a cup 26 filled with the coffee from the machine, Fig. 2. This cup 26, when dispensed from the parts in the manner related, is received by a flared receiver 27, Fig. 10, fixed to the door through its depending projection 28 and rivets 29.

The base plate 18 has two large openings 31 and 32 through which the cups 26 are dispensed. Adjacent each of the respective openings and fixed on the base is a bearing pedestal 33. The bearing pedestal for the opening 31 carries an inner cam 34 serving to engage through its camming edge 35 a lip or top rim 36 of a cup 26 to positively effect its removal from the lower end of a cup stack, Fig. 6. On the opposite pedestal 33 is a similar cam 34' having a similar edge 35' for engaging the cups to be dispensed through the opening 32.

The upright member 19 has outer cam formations 37 and 37' adapted to work on the outer part of the cup to positively separate a cup from the stack and in uniformity with the respective inner cam edges 35 and 35', and whereby the cup will be moved evenly downwardly from the cup stack. These cam edges are elevated sufficiently to permit the passage of the depending cups 26 from the cup stacks over the top of the base plate 18.

Each of the cam plates 34 and 34' are connected to their pedestals 33 by screw bolts 38. Each cam plate has a central hole 39 and the pedestals themselves have holes 41. These holes 39 and 41 receive the lower end of a shaft support 42 of the rotary carrier 43. The shaft 42 has a spacing sleeve or enlargement 44, Fig. 7, adapted to rest upon the cam and to support an inner structure 45 of the rotary support. To this inner structure 45 there are connected a plurality of slotted vertically extending tubes 46 having respectively slots 47 therein. These tubes are adapted to receive the stacks of cups 26 and to permit the feeding of these cups downwardly to the camming edges for effecting the separation of a cup, one at a time, and alternately from the respective tubes. The upper ends of the tubes are closed at their slots by arcuate shaped plates 48 and at their lower ends by plates 49. These plates maintain the shape of the tubes and keep the slot edges from separating from one another. The entire structure can be formed by welding the various parts together in nested relationship. The tubes are circumferentially arranged about the center shaft support 42. Each tube has a depending projection 51 adapted to sweep the cup, as the rotary support is turned, in a manner to be presently described, toward the openings in the base plate.

About each pedestal 33 is a raised arcuate portion 53 over which the cups 26 will ride when being brought toward the discharge openings in the plate 18. The projection ends at the opening and as the cup arrives at the opening, it will drop downwardly therethrough into the receiver 27, as shown in Fig. 10. The stack of cups will be supported on the cam edges 35 and 37 while they are passing over the opening.

The shaft 42 of the rotary support upon extending downwardly through opening 41 in the pedestal leaves the bottom of the plate and has a gear 54 thereon. This gear 54 meshes with a gear 54' which is secured to the shaft of the other rotary cup support. The rotary cup supports thus are operated in unison and in timed relationship with respect to one another. The rotary supports will be angled with respect to one another so that a discharge of a cup from first one support is made and then alternately from the other support. One rotary support brings its cup into position to discharge through its opening and then the other support follows with its cup. This alternate discharge from one support to another continues throughout the complete discharging of the cups.

On the base and on the under side thereof is an electric motor 55 having a reduction gearing 56 which is in mesh with the gear 54 to drive the same, Fig. 5. The gear 54' is in mesh with gear 57 which in turn drives a pinion 58 of a switch operating disc 59 having notches 61 therein for receiving a pin 62 of a switch 63. Switch 63 serves as a stop switch for the electric motor when the rotary devices have been turned sufficiently to discharge the cup and before the succeeding cup has been advanced sufficiently to be discharged.

The electric motor will be started when one of the push buttons of a push button switch 64 is pushed and the switch 63 will stop the motor. Any wiring arrangement for effecting this result can be applied.

One of the tubes 46 may have a projection 65 extending from the side of its slot 47 and to which is pivotally connected an arm 67 by a screw 68. The arm 67 is weighted and will pivot downwardly upon the cups 26 dropping from a projection 69 of the arm 67 so that cam 67 will be thrown into registry for the operation of a switch operating arm 71, Fig. 8, which operates a contact terminal 72 pivoted upon the same. The switch arm or contact terminal 72 will be lowered on the contact terminal 73 by the operating arm 71 which is pivoted upon a bracket 74, Fig. 6.

Upon the supply of cups being depleted, the arm 67 moves out and closes the switch terminals 72 and 73 so as to effect the indicating light 76 so as to light the same and give an indication to the owner of the dispenser of the lack of cups. A catch 77 will retain the door 10 in a closed position upon the main casing 11.

In operation, any one of the buttons in the switch block 64 can be depressed so as to start the operation of the dispenser and which will cause the operation of the motor 55 so as to cause the rotary supports 43 to be rotated. Each of these supports have tubes 46 filled with stacks of paper cups and first a cup will be dispensed from one rotary support and then from the other. The rotation of the supports will be arrested when the switch button 62 of the stop switch 63 can enter any one of the notches 61 of the operating disc 59, Fig. 5. The cam edges 35 and 35' are so shaped to enter between lips 36 of cups 26 and to forcibly separate the lowermost cup from the cup immediately above it. Finally, as the cup has been separated sufficiently, it is free to leave the lower end of the uppermost cup and pass through the discharge holes 31 and 32 into the receiver 27. The receiver 27 has a flared wall to direct the movement of the cup downwardly into a center space on the bottom thereof. In proper timed relation, the liquid will be passed to the passage 21 of the member 19 and dispensed through the plate opening 22 to the cup. The cup thereafter can be removed from the door through the ring opening 25.

It should now be apparent that there has been provided an automatic drinking cup device which comprises two rotary supports carrying columns or stacks of drinking cups and positive cam means for separating the bottom cups from the stack, first from one rotary support and then from the other rotary support and dispensing them through a discharge opening into a cup receiver and that the entire assembly can be easily mounted upon a door of a liquid dispenser.

While various changes may be made in the detail construction, it shall be understood that such changes shall be within the spirit and scope of the present invention as defined by the appended claims.

What is claimed is:

1. An automatic drinking cup dispensing device comprising a base, rotary supports pivoted upon the base adjacent one another, each of said supports having a plurality of tubes for receiving stacks of cups, means for rotating the rotary supports including timing drive elements, said base having discharge openings therein beneath the respective rotary supports for the discharge of cups therethrough and cam elements supported on the base and engageable with the cup stacks to work the lowermost cup from the stack for delivery to the discharge openings, the stacks being arranged in the respective rotary supports and the timing drive elements being such as to discharge a cup from first one rotary support and then from the other in an alternate manner.

2. An automatic drinking cup dispensing device comprising a base, two rotary supports pivoted upon the base for rotation thereupon, said base having discharge openings, each of said rotary supports having a plurality of tubes adapted to receive and carry a stack of drinking cups, cam means carried on the base and adapted to engage the lowermost cup of the several stacks of cups to separate the same from the stack and to free it for discharge through the base openings, timing gears connected between the rotary supports, an electric motor connected to the timing gears to rotate the same, said electric motor being adapted to be connected to a control switch for starting the operation of the supports, and a stop switch for stopping the action of the motor, and an actuator for the stop switch adapted to be driven by said timing gears.

3. An automatic drinking cup dispensing device comprising a base, rotary supports pivoted upon the base adjacent one another, each of said supports having a plurality of tubes for receiving stacks of cups, means for rotating the rotary supports including timing drive elements, said base having discharge openings therein beneath the respective rotary supports for the discharge of cups therethrough and cam elements supported on the base and engageable with the cup stacks to work the lowermost cup from the stack for delivery to the discharge openings, the stacks being arranged in the respective rotary supports and the timing drive elements being such as to discharge a cup from first one rotary support and then from the other in an alternate manner and each of said tubes having a depending sweeping projection, said base having raised arcuate supporting projections disposed respectively beneath the respective rotary supports for supporting the stacks of cups when they are moving independently of the cam elements, and said depending sweeping projections adapted to move the respective stacks of cups over the raised arcuate supporting projections.

4. An automatic drinking cup dispensing device comprising a base, rotary supports pivoted upon the base adjacent one another, each of said supports having a plurality of tubes for receiving stacks of cups, means for rotating the rotary supports including timing drive elements, said base having discharge openings therein beneath the respective rotary supports for the discharge of cups therethrough and cam elements supported on the base and engageable with the cup stacks to work the lowermost cup from the stack for delivery to the discharge openings, the stacks being arranged in the respective rotary supports and the timing drive elements being such as to discharge a cup from first one rotary support and then from the other in an alternate manner and a weighted arm pivotally connected to each of said tubes and adapted to be held in one position by the stack of cups but movable to a second position upon the cups being emptied from the tube, and a signal actuating element lying intermediate said rotary supports and adapted to be engaged by the weighted arm when in its released position whereby to effect an indication that the cup dispensing device is free of cups and needs to be refilled.

HERMANN F. BREMER.
JOSEPH A. GONDOLFO.

REFERENCES CITED

The following references are of record in the file of this patent:

UNITED STATES PATENTS

| Number | Name | Date |
|---|---|---|
| 1,159,245 | Millard | Nov. 2, 1915 |
| 1,905,180 | Lowther | Apr. 25, 1933 |
| 1,975,540 | Folger | Oct. 2, 1934 |
| 2,284,880 | Nicholson | June 2, 1942 |
| 2,407,968 | Von Stoeser | Sept. 17, 1946 |